(12) United States Patent
Canova et al.

(10) Patent No.: US 12,198,476 B2
(45) Date of Patent: Jan. 14, 2025

(54) SYSTEMS AND METHODS FOR VEHICLE DYNAMICS AND POWERTRAIN CONTROL USING MULTIPLE HORIZON OPTIMIZATION

(71) Applicant: Ohio State Innovation Foundation, Columbus, OH (US)

(72) Inventors: Marcello Canova, Columbus, OH (US); Shreshta Rajakumar Deshpande, Columbus, OH (US); Shobhit Gupta, Columbus, OH (US); Abhishek Gupta, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/774,677

(22) PCT Filed: Nov. 6, 2020

(86) PCT No.: PCT/US2020/059346
§ 371 (c)(1),
(2) Date: May 5, 2022

(87) PCT Pub. No.: WO2021/092334
PCT Pub. Date: May 14, 2021

(65) Prior Publication Data
US 2022/0398873 A1 Dec. 15, 2022

Related U.S. Application Data

(60) Provisional application No. 62/931,293, filed on Nov. 6, 2019.

(51) Int. Cl.
*G07C 5/00* (2006.01)
*B60W 40/105* (2012.01)
*G07C 5/02* (2006.01)

(52) U.S. Cl.
CPC ........... *G07C 5/008* (2013.01); *B60W 40/105* (2013.01); *G07C 5/02* (2013.01); *B60W 2510/10* (2013.01)

(58) Field of Classification Search
CPC ........... B60W 40/105; B60W 2510/10; B60W 40/00–40/13; B60W 2050/0013;
(Continued)

(56) References Cited

U.S. PATENT DOCUMENTS 10,045,173 B1 * 8/2018 Morimura .............. B60Q 1/525
11,685,408 B1 * 6/2023 Zhao .................. G01C 21/3841
701/25
(Continued)

FOREIGN PATENT DOCUMENTS

| CN | 107813814 A | 3/2018 |
|---|---|---|
| DE | 102014219216 A1 | 3/2016 |
| DE | 102017206209 A1 | 10/2018 |

OTHER PUBLICATIONS

International Searching Authority (ISA/US). International Search Report and Written Opinion issued in PCT Application No. PCT/US2020/059346 on Feb. 4, 2021. 8 pages.
(Continued)

*Primary Examiner* — Mohamed Abdo Algehaim
(74) *Attorney, Agent, or Firm* — Meunier Carlin & Curfman LLC (57) ABSTRACT

The use of multiple horizon optimization for vehicle dynamics and powertrain control of a vehicle is provided. Long horizon optimization for a trip of the vehicle is performed, and an optimal value function is determined. Data is received from powertrain and/or connectivity features from one or more of components of the vehicle. Short horizon optimization for the trip is performed using a rollout algorithm, the optimal value function, and the received data. The
(Continued)

operation of the vehicle is adjusted using results of the short horizon optimization.

15 Claims, 5 Drawing Sheets

(58) Field of Classification Search
CPC ..... B60W 2050/0028; B60W 2556/50; B60W 2720/10; B60W 20/12; B60W 10/00–2900/00; B60W 2556/20; G07C 5/008; G07C 5/02; G01C 21/26; G01C 21/00–21/3896; G01C 1/00–2111/67
USPC ........................................................ 701/29.1
See application file for complete search history.

(56) References Cited

U.S. PATENT DOCUMENTS

| | | | | |
|---|---|---|---|---|
| 2012/0123651 | A1* | 5/2012 | Johansson | B60W 10/10 701/51 |
| 2017/0031361 | A1* | 2/2017 | Olson | B60W 30/0956 |
| 2018/0143643 | A1* | 5/2018 | Fairfield | G05D 1/0217 |
| 2018/0181133 | A1* | 6/2018 | Zhang | G06V 20/58 |
| 2018/0284785 | A1* | 10/2018 | Berntorp | G06V 20/584 |
| 2019/0168753 | A1* | 6/2019 | Borhan | B60W 30/143 |
| 2019/0291726 | A1* | 9/2019 | Shalev-Shwartz | G01S 17/931 |
| 2019/0291728 | A1* | 9/2019 | Shalev-Shwartz | B60T 7/18 |
| 2019/0295179 | A1* | 9/2019 | Shalev-Shwartz | G07C 5/02 |
| 2019/0318277 | A1* | 10/2019 | Goldman | G06Q 50/40 |
| 2019/0375394 | A1* | 12/2019 | Maleki | B60W 20/11 |
| 2020/0114917 | A1* | 4/2020 | Oguro | B60W 30/181 |
| 2020/0142420 | A1* | 5/2020 | Kusari | B60W 30/18163 |
| 2020/0159225 | A1* | 5/2020 | Zeng | G01C 21/3453 |
| 2020/0160598 | A1* | 5/2020 | Manivasagam | G01S 17/89 |
| 2020/0326194 | A1* | 10/2020 | Wang | G05D 1/0293 |
| 2021/0046946 | A1* | 2/2021 | Nemec | G05D 1/0061 |
| 2021/0061278 | A1* | 3/2021 | Zhao | G01C 21/3492 |
| 2021/0072742 | A1* | 3/2021 | Wu | G05B 15/02 |
| 2021/0089030 | A1* | 3/2021 | Mehdi | B60W 50/00 |
| 2021/0094577 | A1* | 4/2021 | Shalev-Shwartz | B60W 30/0953 |
| 2021/0110484 | A1* | 4/2021 | Shalev-Shwartz | B60W 10/18 |
| 2021/0129836 | A1* | 5/2021 | Nguyen | G06V 10/764 |
| 2021/0165409 | A1* | 6/2021 | Berntorp | G05D 1/0214 |
| 2021/0178600 | A1* | 6/2021 | Jha | B25J 9/1697 |
| 2022/0048498 | A1* | 2/2022 | Khandelwal | G06V 10/82 |
| 2022/0326041 | A1* | 10/2022 | Beresford | G01C 21/3841 |
| 2023/0042431 | A1* | 2/2023 | Ramamoorthy | B60W 60/0011 |
| 2023/0391328 | A1* | 12/2023 | Van Koutrik | B60W 30/143 |

OTHER PUBLICATIONS

European Patent Office. Extended European search report. European Application No. 20884261.7. Issued on Mar. 19, 2024. 11 pages.

Shen, D. et al. (2018). Energy management of fuel cell hybrid vehicle based on partially observable Markov decision process. IEEE Transactions on Control Systems Technology, 28(2), 318-330.

Lim, H. et al. (2017). Distance-based ecological driving scheme using a two-stage hierarchy for long-term optimization and short-term adaptation. IEEE Transactions on Vehicular Technology, 66(3), 1940-1949.

* cited by examiner

SYSTEMS AND METHODS FOR VEHICLE DYNAMICS AND POWERTRAIN CONTROL USING MULTIPLE HORIZON OPTIMIZATION

CROSS-REFERENCE TO RELATED APPLICATIONS

This application is a national stage application filed under 35 U.S.C. § 371 of PCT/US2020/059346 filed Nov. 6, 2020, which claims the benefit of U.S. provisional patent application No. 62/931,293, filed on Nov. 6, 2019, and entitled "METHOD FOR VEHICLE DYNAMICS AND POWERTRAIN CONTROL USING MULTIPLE HORIZON OPTIMIZATION," the disclosure of which is expressly incorporated herein by reference in its entirety.

STATEMENT OF GOVERNMENT SUPPORT

This invention was made with government support under Award Number DE-AR000794 awarded by the Department of Energy. The government has certain rights in the invention.

BACKGROUND

The objective of the nonlinear dynamic optimization problem, formulated in the spatial domain, is to minimize the fuel consumption of the vehicle over an entire itinerary. A benefit of spatial trajectory formulation is that it inherently lends itself well to the incorporation of route-related information such as posted speed limit signs, traffic lights and stop signs, whose positions along the route remain fixed. In contrast, inclusion of such route features in a temporal domain problem is quite tedious.

It is with respect to these and other considerations that the various aspects and embodiments of the present disclosure are presented.

SUMMARY

The systems and methods described herein remove the drawbacks associated with previous systems and methods. Certain aspects of the present disclosure relate to vehicle dynamics and powertrain control using multiple horizon optimization.

In an implementation, a method of using multiple horizon optimization for vehicle dynamics and powertrain control of a vehicle is provided. The method comprises: performing long horizon optimization for a trip of the vehicle; determining an optimal value function based on the long horizon optimization; receiving data from one or more of powertrain or connectivity features from one or more of components of the vehicle; performing short horizon optimization for the trip using a rollout algorithm, the optimal value function, and the received data; and adjusting an operation of the vehicle using results of the short horizon optimization.

In an implementation, a method of using multiple horizon optimization for vehicle dynamics and powertrain control of a vehicle is provided. The method comprises: performing an initial optimization for a trip of the vehicle at the beginning of the trip or during the trip; determining an optimal value function based on the initial optimization; storing the optimal value function in a memory associated with the vehicle; and performing short horizon optimization for the trip using updated route information, which is obtained from at least one of vehicle-to-infrastructure/vehicle-to-vehicle (V2I/V2V) modules or cloud-based service providers.

In an implementation, a system for a vehicle is provided. The system comprises: a long horizon optimization module configured to perform a long horizon optimization for a trip of the vehicle; a deterministic optimization module configured to determine an optimal value function; and a short horizon optimization module configured to perform a short horizon optimization for the trip using a rollout algorithm, the optimal value function, and data from one or more of powertrain or connectivity features from one or more of components of the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In some aspects, the present invention relates to systems and methods for vehicle dynamics and powertrain control using multiple horizon (multi-horizon) optimization.

Figure 1:
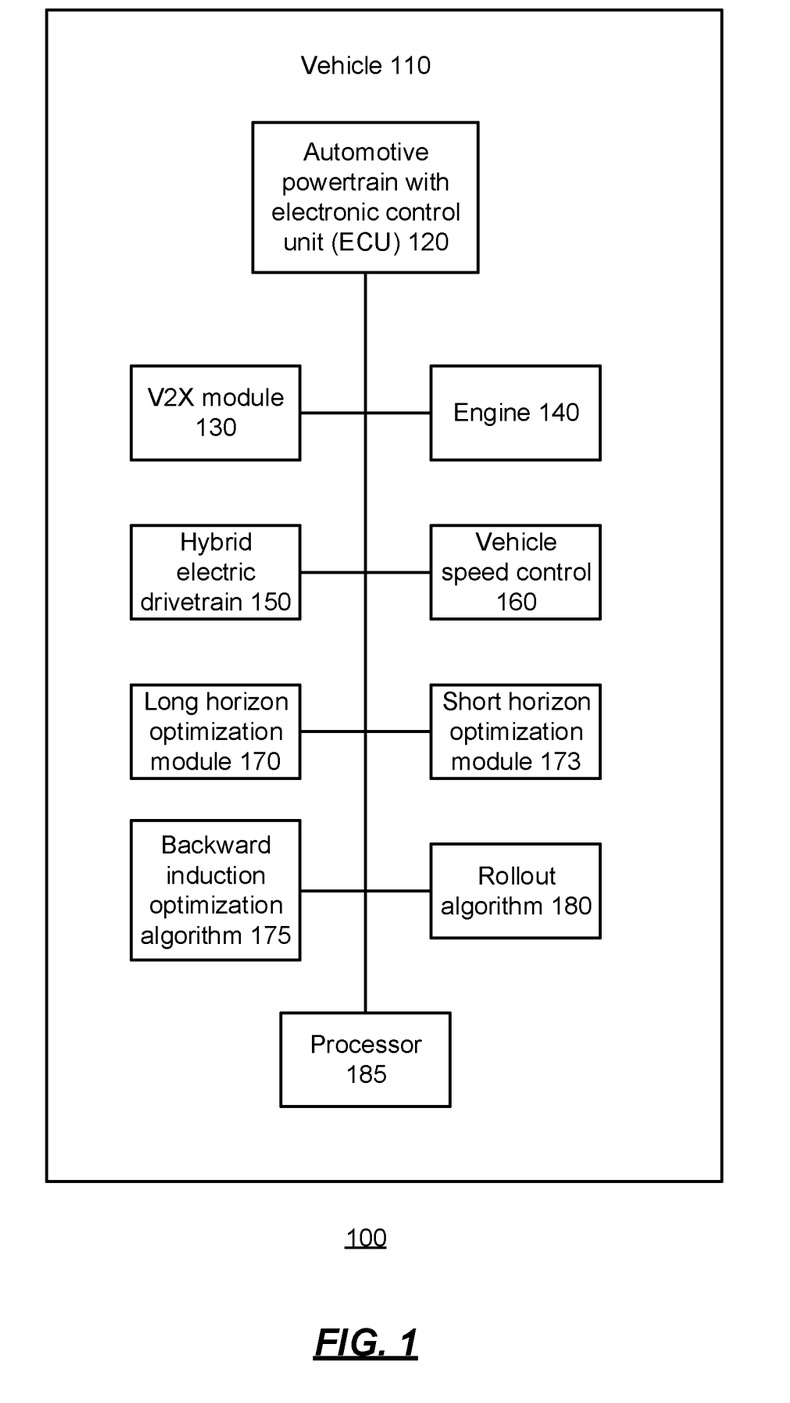
FIG. 1 is an illustration of an exemplary environment for systems and methods for vehicle dynamics and powertrain control using multiple horizon optimization.

FIG. 1 is an illustration of an exemplary environment 100 for systems and methods for vehicle dynamics and powertrain control using multiple horizon optimization. A vehicle 110 comprises an automotive powertrain with an electronic control unit (ECU) 120, an optional vehicle-to-everything (V2X) module 130, an engine 140, a hybrid electric drivetrain 150, and vehicle speed control 160 (e.g., cruise control, adaptive cruise control, etc.).

The vehicle 110 further comprises a long horizon optimization module 170, a short horizon optimization module 173, an optimization algorithm (based on a backward induction method, such as Dynamic Programming (DP) or Stochastic Dynamic Programming (SDP)) 175, and a rollout algorithm 180. A processor 185 (such as comprised within a computing device) may also be included in the vehicle 110. The processor 185 may perform some or all of the operations described further herein, depending on the implementation.

Figure 5:
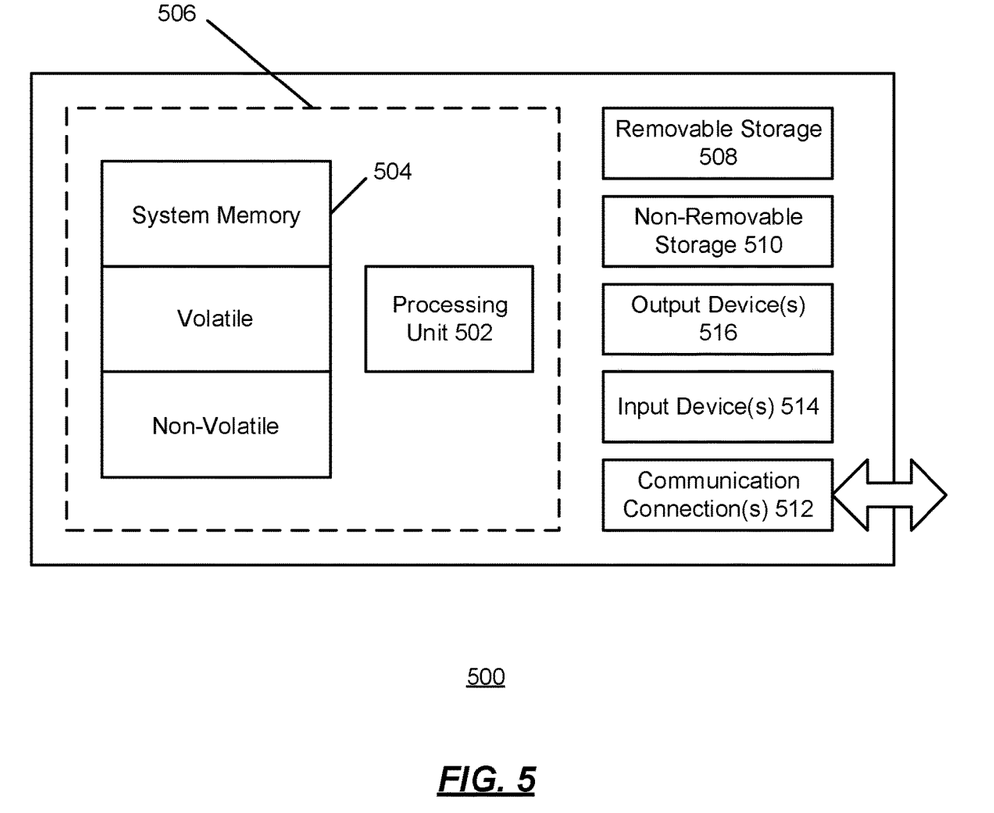
FIG. 5 shows an exemplary computing environment in which example embodiments and aspects may be implemented.

The long horizon optimization module 170, the short horizon optimization module 173, the backward induction optimization algorithm 175, the rollout algorithm 180, and the processor 185 may each be implemented using a variety of computing devices. The automotive powertrain with ECU 120, the optional V2X module 130, the engine 140, the hybrid electric drivetrain 150, and the vehicle speed control 160 may also be implemented using one or more of a variety of computing devices. The computing device(s) may be implemented in (e.g., embodied in) the vehicle 110 in some implementations. A suitable computing device is illustrated in FIG. 5 as the computing device 500.

A multi-horizon optimization approach for vehicle dynamics and powertrain control (VD&PT) is described that takes advantage of connectivity and automation to forecast the impact of future driving conditions. As described further herein, it is contemplated that long horizon optimization may be performed at the beginning of a trip and/or during the trip, depending on the implementation. Thus, for example, long horizon optimization may be computed or re-computed during the trip (e.g., if the route information changes during the trip). Alternately or additionally, long horizon optimization may be performed for multiple trips at once, and that information may be stored. In some implementations, a trip may be considered to be an extended segment of a route that can be pre-computed before the trip is executed.

Aspects described herein are applied to the optimization of automotive powertrains that feature an ECU that oversees the operation of the engine, hybrid electric drivetrain, and vehicle speed control. The vehicle may be equipped with a V2X module that provides features such as global positioning system (GPS) location, navigation system, dedicated short range communication (DSRC), etc. The techniques and aspects described herein substantially improve the fuel economy of such vehicles by combining and optimizing the various contributing powertrain and connectivity features.

Figure 2:
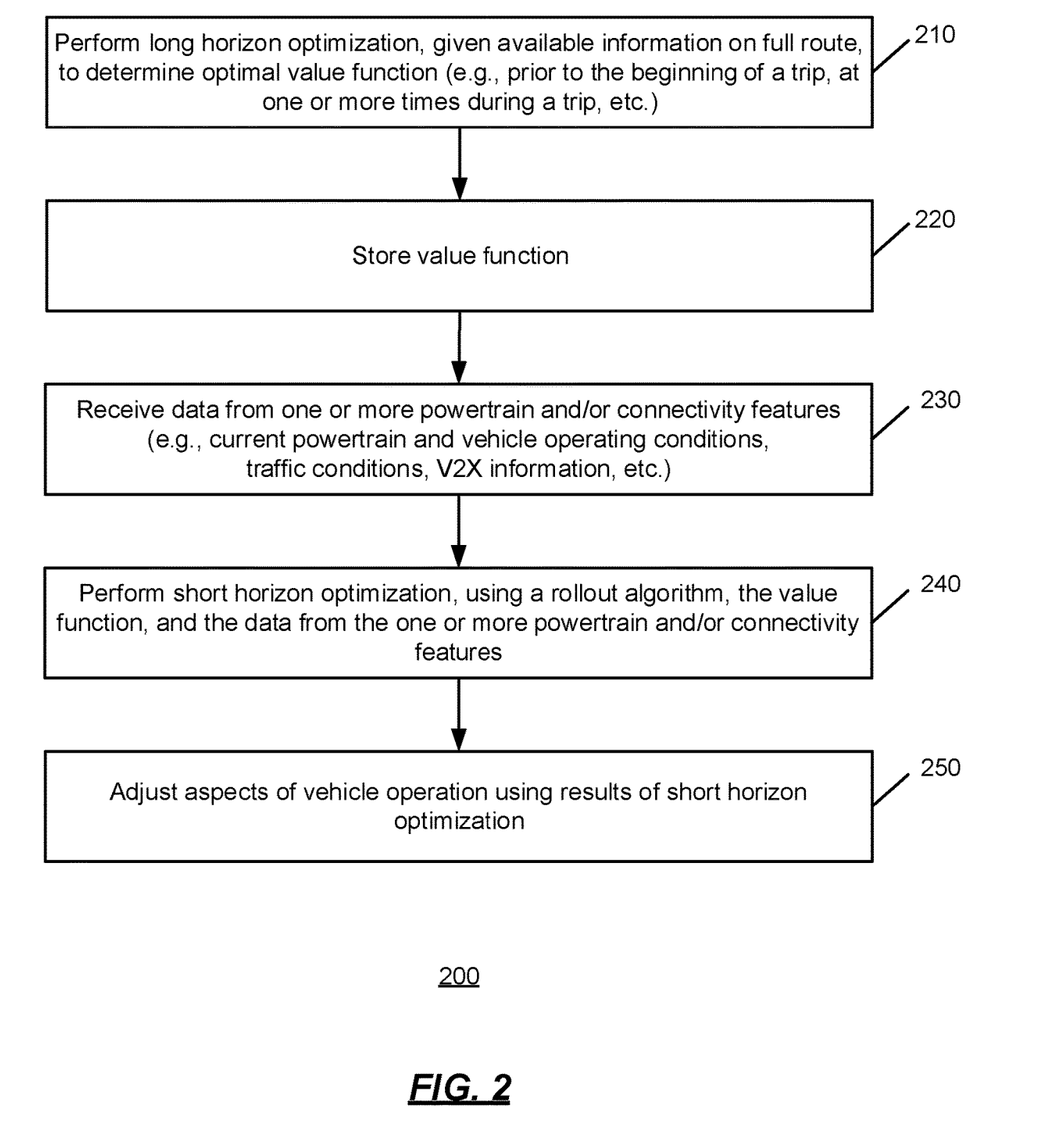
FIG. 2 is an operational flow of an implementation of a method of using multiple horizon optimization for vehicle dynamics and powertrain control.

FIG. 2 is an operational flow of an implementation of a method 200 of using multiple horizon optimization for vehicle dynamics and powertrain control. Further aspects and details are also described with respect to FIG. 3 and below. The method 200 may be implemented in the environment 100 comprising the vehicle 110.

At 210, prior to the vehicle 110 beginning its trip (or at one or more times during the trip, depending on the implementation), long horizon optimization may be performed on initial values and data available at the time, such as route information, posted speed limit signs, traffic lights and stop signs, etc. In this manner, an optimal value function may be determined. The long horizon optimization may be performed by the long horizon optimization module 170.

At 220, the value function may be stored, e.g., in memory associated with the vehicle 110 or a computing device of the vehicle 110 or one of the vehicle's components (e.g., the automotive powertrain with ECU 120, the V2X module 130, the engine 140, the hybrid electric drivetrain 150, the vehicle speed control 160, the long horizon optimization module 170, the short horizon optimization module 173, the backward induction optimization algorithm 175, the rollout algorithm 180, the processor 185).

At 230, as the vehicle 110 is moving along its trip (i.e., after the trip has begun and during the trip), data from one or more powertrain and/or connectivity features are received from one or more of the various components of the vehicle (e.g., the automotive powertrain with ECU 120, the V2X module 130, the engine 140, the hybrid electric drivetrain 150, the vehicle speed control 160). Example features include, but are not limited to, traffic conditions, current powertrain and vehicle operating conditions (of the vehicle 110), and V2X information. The data may be received at the processor 185 or other computing device, depending on the implementation.

At 240, short horizon optimization is performed, e.g., by the short horizon optimization module 173, using the rollout algorithm 180 (which combines the short horizon optimization module 173 to the long horizon optimization module 170), the optimal value function, and the data from the one or more powertrain and/or connectivity features. The short horizon optimization module 173, which is solved using the backward induction optimization algorithm 175.

At 250, aspects of the operation of the vehicle 110 during the trip may be adjusted using the results of the short horizon optimization.

Figure 3:
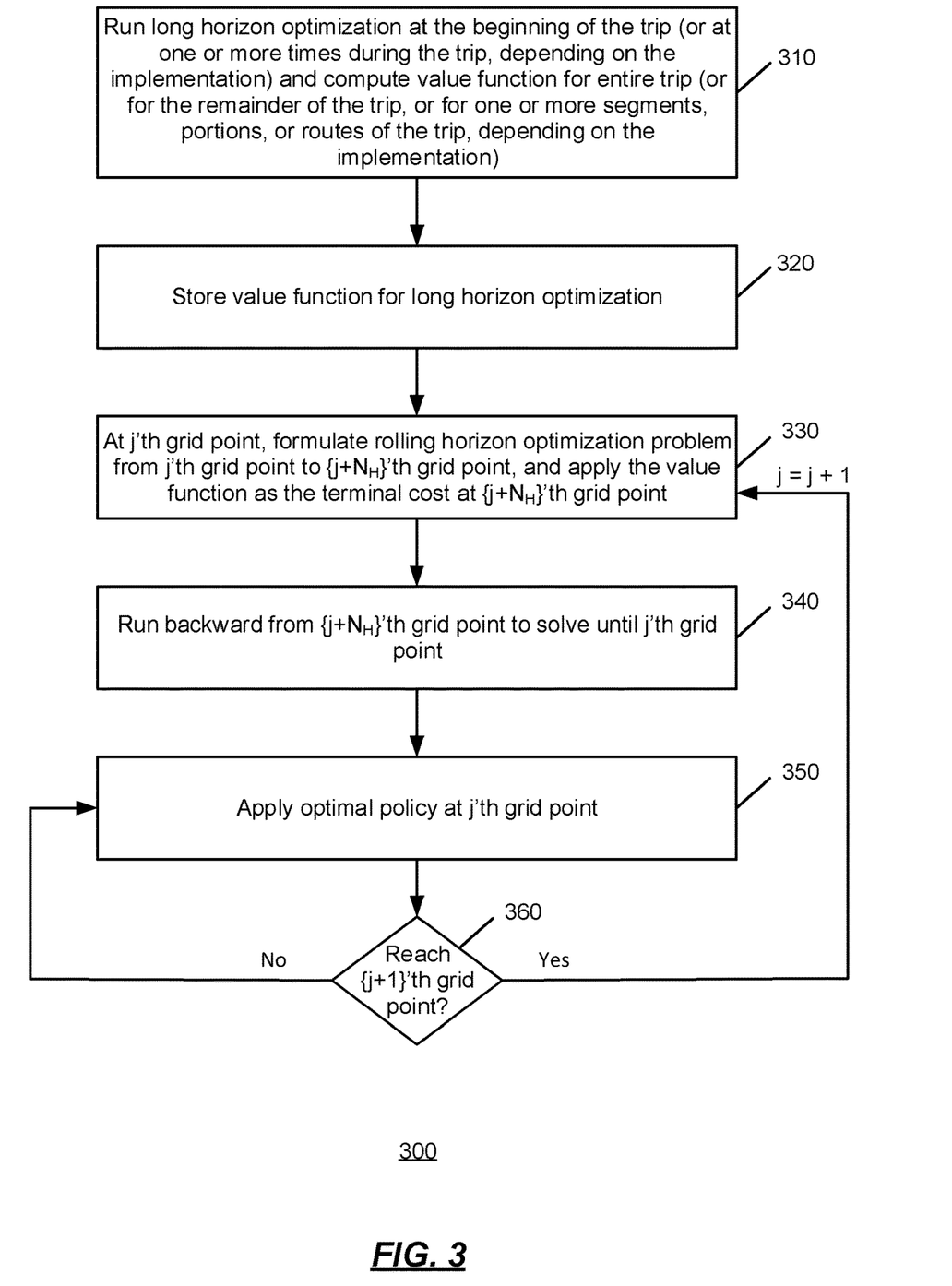
FIG. 3 is an operational flow of another implementation of a method of using multiple horizon optimization for vehicle dynamics and powertrain control.

FIG. 3 is an operational flow of another implementation of a method 300 of using multiple horizon optimization for vehicle dynamics and powertrain control. The method 300 may be implemented in the environment 100 comprising the vehicle 110.

At 310, at the beginning of a trip (or at one or more times during the trip, depending on the implementation), long horizon optimization is run, and a value function is computed for the entire trip (or for the remainder of the trip, or for one or more segments, portions, or routes of the trip, depending on the implementation). The long horizon optimization may be performed by the long horizon optimization module 170. Thus, an initial optimization is performed at the start of the trip (or at one or more times during the trip, depending on the implementation). Route information (including speed limits, traffic conditions available at the time and grade over the entire planned route) are fed to the long horizon optimization using data from cloud-based service providers (e.g., TomTom, Waze, etc.) and intelligent digital maps containing, for example, speed limits and elevation data. The optimal value function is used to provide approximate optimized trajectories for vehicle velocity and powertrain control set-points along the entire route of the trip. The long horizon optimization problem can be solved using one or more of a plurality of backward induction numerical methods, such as DP or SDP, for example, although this is not intended to be limiting.

At 320, the value function may be stored, e.g., in memory associated with the vehicle 110 or a computing device of the vehicle 110 or one of the vehicle's components (e.g., the automotive powertrain with ECU 120, the V2X module 130, the engine 140, the hybrid electric drivetrain 150, the vehicle speed control 160, the long horizon optimization module 170, the short horizon optimization module 173, the backward induction optimization algorithm 175, the rollout algorithm 180, the processor 185).

If there is variability or uncertainty in route information and/or events that occur along the route, the optimization will need to be re-run with the updated information to reflect these changes. For online use, it becomes computationally impractical to periodically perform the full-route (or remaining-route) optimization, considering the limited on-board computational and memory resources. This is a motivation to convert the long horizon problem to a short (e.g., receding) horizon optimal control problem, solved using the backward induction and the rollout algorithm.

At 330, the optimization is re-run for a $N_H$-long horizon, starting at $j^{th}$ grid point along the route (where $N_H$ is significantly shorter than the remaining portion of the route). The stage cost (or running cost) of the short horizon optimization contains the same terms as that of the long horizon optimization, and the value function in memory is applied as the terminal cost. The constraints fed to this short horizon dynamic optimization contains updated route information, which is obtained from vehicle-to-infrastructure/vehicle-to-vehicle (V2I/V2V) modules, cloud-based service providers and dedicated short range communication (DSRC) units.

At 340, the $N_H$ horizon optimization problem is solved in a backward manner using the rollout algorithm, starting from the terminal stage ($\{j+N_H\}^{th}$ grid point) until the initial stage ($j^{th}$ grid point) in the current receding horizon.

At 350, the resulting optimal policy is then applied at the $j^{th}$ grid point to make the system transition to the $\{j+1\}^{th}$ grid point.

At 360, at the $\{j+1\}^{th}$ grid point, the same procedure is applied recursively to solve the $N_H$ horizon problem.

Consider a dynamic optimization problem with a long horizon, as encountered in full-route optimization. As explained earlier, considering the limited on-board computational resources available and that various conditions experienced en route are variable, this long horizon optimization has to be transformed to a short horizon problem.

The rollout algorithm is a method of value space approximation that makes use of the cost-to-go of some known suboptimal/heuristic policy, referred to as the base policy or base heuristic. Under suitable assumptions, it can be shown that if the base heuristic produces a feasible solution, the rollout algorithm also produces a feasible solution, whose cost is no worse than the cost corresponding to the base heuristic. This is called cost improvement with rollout policy, a result that can be proved using mathematical induction. If the base policy is chosen as a reference DP policy, then cost improvement guarantees that the online solution implemented is no worse than this reference. For cost improvement to be valid, it is important that the base heuristic and the rollout policy are computed over the same constraint set. In the context of the real-time eco-driving problem considered, cost improvement is of relevance as the rollout algorithm is inherently robust to parametric uncertainties and modeling errors experienced en route.

In the case of powertrain control, given the traffic conditions and downstream road conditions, the terminal cost in the powertrain optimization problem can be determined via a certain heuristic. For instance, the terminal cost can be considered as the optimal cost incurred to reach the destination (termed as cost-to-go or value function), starting from the current state (i.e., the terminal state of the current receding horizon problem) under no traffic conditions. Thereafter, the powertrain optimizer can solve the resulting dynamic optimization problem periodically to ensure that all the critical constraints are satisfied under the updated operating conditions.

An advantage of the rollout algorithm developed is that the optimal solution is updated periodically in response to changing route conditions. Further, the reduced computational effort to compute a short horizon optimization while achieving close-to-optimal results is appealing. The cost improvement property of the rollout algorithm guarantees the desired performance of the resulting solution, especially when it is applied to real-world problems containing uncertainties. Another advantage is that the techniques can still operate in temporary absence of V2X communications (as the base heuristic still works). Further, the frequency of execution of the short horizon optimization can be adjusted based on computational needs and frequency of updates of V2X information.

Figure 4:
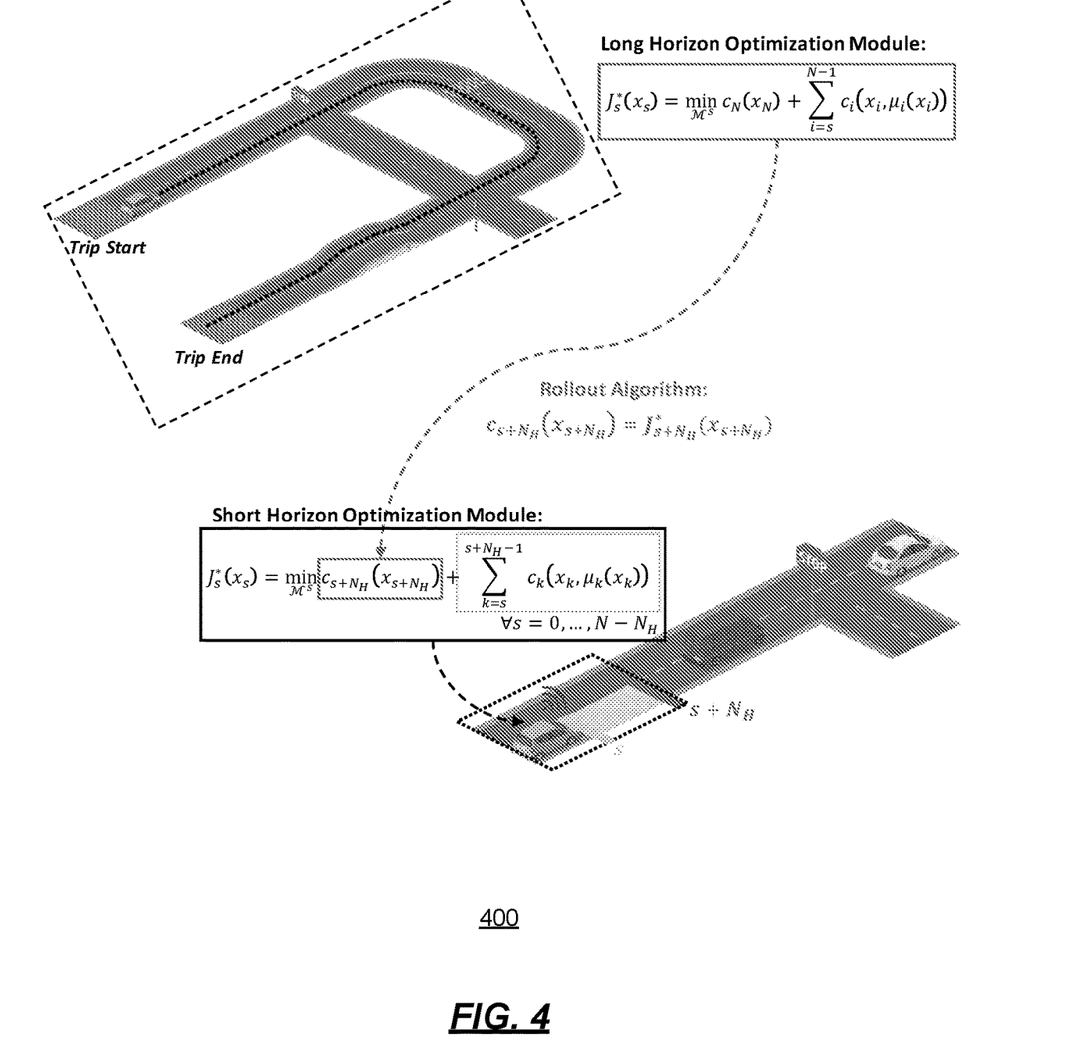
FIG. 4 is diagram useful for describing various aspects of using multiple horizon optimization for vehicle dynamics and powertrain control.

An implementation of a rollout algorithm (approximate dynamic programming or ADP) is now described. In an implementation, a rollout algorithm uses a deterministic or stochastic forecast of future events to solve an optimization problem that extends over a predictive horizon $N_H$ steps, instead of the full route N steps and implements the decision for the immediate step as shown in FIG. 4. FIG. 4 is diagram 400 useful for describing various aspects of using multiple horizon optimization for vehicle dynamics and powertrain control.

FIG. 4 illustrates the methodology used for an application of the rollout algorithm over a given horizon. The rollout algorithm is a sequential short horizon optimization technique that relies on a base policy/base heuristic. As shown FIG. 4, this base heuristic is assumed to be the value function obtained after solving (generally evaluated prior to the trip) a long horizon (full route) optimization problem and is imposed as the terminal cost at the end of each $N_H$ horizon in the short horizon optimization framework.

The exemplary global optimization problem is formulated for a route having N steps, and the corresponding exemplary receding horizon optimization is formulated over $N_H \ll N$ steps.

Consider a dynamic control problem discretized in the spatial domain having the form:

$$x_{s+1}=f_s(x_s,u_s), \forall s=1,\ldots,N-1$$

where s is the discrete position or grid point along the route, $x_s \in \chi_s \subset \mathbb{R}^p$ is the state, $u_s \in \mathcal{U}_s \subset \mathbb{R}^q$ is the input or control, and $f_s$ is a function that describes the state dynamics.

The control and the state are constrained, and the constraint function $h_s: \chi_s \times \mathcal{U}_s \to \mathbb{R}^r$ is expressed as:

$$h_s(x_s,u_s) \leq 0, \forall s=1,\ldots,N-1.$$

An admissible control map at position s is a map $\mu_s: \chi \to \mathcal{U}$ such that:

$$h_s(x_s,\mu_s(x)) \leq 0, \forall x \in \chi$$

The collection of admissible control maps is denoted by $\mathcal{M} := (\mu_1, \ldots, \mu_{N-1})$, which is referred to as the policy of the controller.

The controller aims at minimizing a cost, given by:

$$J(\mathcal{M}) = c_N(x_N) + \sum_{s=1}^{N-1} c_s(x_s, u_s)$$

where, $c_s: \chi_s \times \mathcal{U}_s \to \mathbb{R}$ is the per stage cost function. The cost function can be defined based on a single or multiple objectives, including but not limited to fuel consumption, travel time, or other performance and drivability metrics. For use in the backward induction optimization algorithm 175, the cost function can be rewritten as:

$$J_s^*(\mathcal{X}_s) = \min_{\mathcal{M}^s} c_N(\mathcal{X}_N) + \sum_{i=s}^{N-1} c_i(\mathcal{X}_i, \mu_i(\mathcal{X}_i)),$$

where $\mathcal{M}^s := (\mu_s, \mu_{s+1}, \ldots, \mu_{N-1})$ for any admissible policy $\mathcal{M}$ and each $s=1, \ldots, N-1$. This definition is consistent with FIG. 4. The cost function of the receding horizon optimization problem in FIG. 4 that is solved using the rollout algorithm is defined as:

$$J_s^*(\mathcal{X}_s) = \min_{\mathcal{M}^s} c_{s+N_H}(\mathcal{X}_{s+N_H}) + \sum_{k=s}^{s+N_H-1} c_k(x_k, \mu_k(x_k)), \forall s = 1, \ldots, N - N_H$$

where $N_H$ is the length of the receding horizon. This problem formulation is consistent with the representation in FIG. 4. A key challenge here that is handled by the proposed rollout algorithm is the definition of an appropriate terminal cost and/or terminal state constraints.

In this formulation, the signal phase information of each traffic light is deterministically incorporated as part of the initialization process before the trip begins. Varying timing information (i.e., time in each phase) however, cannot be utilized in the full-route optimization routine. To address this concern, this work can be extended to include a pass-in-green model that handles maneuvers at signalized intersections.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

In an implementation, a method of using multiple horizon optimization for vehicle dynamics and powertrain control of a vehicle is provided. The method comprises: performing long horizon optimization for a trip of the vehicle; determining an optimal value function based on the long horizon optimization; receiving data from one or more of powertrain or connectivity features from one or more of components of the vehicle; performing short horizon optimization for the trip using a rollout algorithm, the optimal value function, and the received data; and adjusting an operation of the vehicle using results of the short horizon optimization.

Implementations may include some or all of the following features. The long horizon optimization is performed at least one of prior to the beginning of the trip or during the trip. Performing long horizon optimization comprises using route information and the backward induction optimization algorithm. The method further comprises storing the optimal value function in a memory associated with the vehicle. The data is received from the one or more of powertrain or connectivity features after the trip has begun and during the trip. The data comprises at least one of traffic conditions, operating conditions of the vehicle, and V2X information. The one or more components of the vehicle comprise at least one of an automotive powertrain with electronic control unit (ECU), a vehicle-to-everything (V2X) module, an engine, a hybrid electric drivetrain, and a vehicle speed control. The operation of the vehicle comprises vehicle dynamics and powertrain control of the vehicle.

In an implementation, a method of using multiple horizon optimization for vehicle dynamics and powertrain control of a vehicle is provided. The method comprises: performing an initial optimization for a trip of the vehicle at the beginning of the trip or during the trip; determining an optimal value function based on the initial optimization; storing the optimal value function in a memory associated with the vehicle; and performing short horizon optimization for the trip using updated route information, which is obtained from at least one of vehicle-to-infrastructure/vehicle-to-vehicle (V2I/V2V) modules or cloud-based service providers.

Implementations may include some or all of the following features. Performing the initial optimization comprises performing long horizon optimization using a long horizon optimization module of the vehicle. Performing the long horizon optimization uses route information received from cloud-based service providers and intelligent digital maps, and uses the backward induction optimization algorithm. Determining the optimal value function is performed by a deterministic optimization module of the vehicle. The method further comprises providing approximate optimized trajectories for vehicle velocity and powertrain control setpoints along an entire route of the trip, using the optimal value function. The method further comprises adjusting an operation of the vehicle using results of the short horizon optimization. Performing short horizon optimization further uses a rollout algorithm and the optimal value function.

In an implementation, a system for a vehicle is provided, The system comprises: a long horizon optimization module configured to perform a long horizon optimization for a trip of the vehicle; a deterministic optimization module configured to determine an optimal value function; and a short horizon optimization module configured to perform a short horizon optimization for the trip using a rollout algorithm, the optimal value function, and data from one or more of powertrain or connectivity features from one or more of components of the vehicle.

Implementations may include some or all of the following features. The system further comprises a processor configured to adjust an operation of the vehicle using results of the short horizon optimization. The long horizon optimization module and the short horizon optimization module are comprised within the vehicle. The components of the vehicle comprise at least one of an automotive powertrain with an electronic control unit (ECU), an engine, a hybrid electric drivetrain, a vehicle speed control, or a vehicle-to-everything (V2X) module. The long horizon optimization module is further configured to use route information and the backward induction optimization algorithm to perform the long horizon optimization at least one of prior to the beginning of the trip or during the trip.

As used herein, the singular form "a," "an," and "the" include plural references unless the context clearly dictates otherwise.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that the various techniques described herein may be implemented in connection with hardware components or software components or, where appropriate, with a combination of both. Illustrative types of hardware components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of using multiple horizon optimization for vehicle dynamics and powertrain control of a vehicle, the method comprising:
   at a beginning of a trip:
   identifying, from received route information, at least one characteristic of a portion of a predetermined route;
   performing long horizon optimization for the trip of the vehicle based on at least one route characteristic of the portion of the predetermined route;
   determining an optimal value function based on the long horizon optimization at the beginning of the trip;
   wherein the optimal value function provides optimized trajectories for vehicle velocity and powertrain control set-points along the entire predetermined route of the trip; and
   after the vehicle begins moving on the trip;
   periodically receiving data from powertrain and connectivity features during the trip from one or more components of the vehicle that identifies the at least one route characteristic of the predetermined route;
   performing short horizon optimization for the trip using a rollout algorithm, the optimal value function, and the received data; and periodically adjusting an operation of an engine, hybrid electric drivetrain, and vehicle speed of the vehicle during the trip using results of the short horizon optimization to improve fuel economy.

2. The method of claim 1, wherein performing the long horizon optimization comprises using received route information and backward induction optimization.

3. The method of claim 1, further comprising storing the optimal value function in a memory associated with the vehicle.

4. The method of claim 1, wherein the data comprises at least one of traffic conditions, operating conditions of the vehicle, and vehicle-to-everything (V2X) information.

5. The method of claim 1, wherein the operation of the vehicle comprises said vehicle dynamics and said powertrain control of the vehicle.

6. The method of claim 1, further comprising:
determining that there is uncertainty in the received route information associated with the trip; and
in response to the determination, reperforming the long horizon optimization.

7. The method of claim 1, wherein performing the long horizon optimization comprises using the received route information and stochastic dynamic programming.

8. The method of claim 1, further comprising recomputing the long horizon optimization if the received route information changes for the trip.

9. The method of claim 1, wherein the at least one characteristic of the portion of the predetermined route comprises one of speed limits, traffic control signals or signs, traffic conditions, and elevation data.

10. A system for a vehicle, the system comprising:
a long horizon optimization module configured to perform, at a beginning of a trip, a long horizon optimization for the trip of the vehicle using at least one characteristic of a portion of a predetermined route of the trip;
a deterministic optimization module configured to determine, at the beginning of the trip, an optimal value function based on the long horizon optimization at the beginning of the trip, wherein the optimal value function provides optimized trajectories for vehicle velocity and powertrain control set-points along the predetermined route of the trip;
a short horizon optimization module configured to, after the vehicle begins moving on the trip, periodically perform a short horizon optimization for the trip using a rollout algorithm, the optimal value function, information that identifies at least one route characteristic of a remaining portion of the predetermined route, and data received during the trip from powertrain and connectivity features from one or more components of the vehicle; and
a processor configured to, after the vehicle begins moving on the trip, periodically adjust an operation of an engine, hybrid electric drivetrain, and vehicle speed of the vehicle during the trip using results of the short horizon optimization to improve fuel economy.

11. The system of claim 10, wherein the long horizon optimization module and the short horizon optimization module are comprised within the vehicle.

12. The system of claim 10, wherein the one or more components of the vehicle comprise at least one of an automotive powertrain with an electronic control unit (ECU), an engine, a hybrid electric drivetrain, a vehicle speed control, or a vehicle-to-everything (V2X) module.

13. The system of claim 10, wherein the long horizon optimization module is further configured to use route information and backward induction optimization to perform the long horizon optimization.

14. The system of claim 10, wherein the long horizon optimization module recomputes the long horizon optimization if route information changes for the trip.

15. The system of claim 10, wherein the at least one characteristic of the portion of the predetermined route comprises one of speed limits, traffic control signals or signs, traffic conditions, and elevation data.

* * * * *